(12) United States Patent
Rogers et al.

(10) Patent No.: US 11,249,177 B2
(45) Date of Patent: Feb. 15, 2022

(54) TRANSCEIVER ASSEMBLY FOR DETECTING OBJECTS

(71) Applicant: THE BOEING COMPANY, Chicago, IL (US)

(72) Inventors: John E. Rogers, Huntsville, AL (US); Robert Alan Smith, Hampton Cove, AL (US)

(73) Assignee: THE BOEING COMPANY, Chicago, IL (US)

( * ) Notice: Subject to any disclaimer, the term of this patent is extended or adjusted under 35 U.S.C. 154(b) by 337 days.

(21) Appl. No.: 16/443,279

(22) Filed: Jun. 17, 2019

(65) Prior Publication Data

US 2020/0393551 A1 Dec. 17, 2020

(51) Int. Cl.
*G01S 13/04* (2006.01)
*G01S 13/00* (2006.01)

(52) U.S. Cl.
CPC ............ *G01S 13/04* (2013.01); *G01S 13/003* (2013.01)

(58) Field of Classification Search
CPC ...... G01S 13/003; G01S 13/04; G01S 13/887; G01S 7/027; H01Q 21/28
USPC ....... 455/9, 13.3, 67.11, 67.16; 342/22, 146, 342/134, 37, 637, 702
See application file for complete search history.

(56) References Cited

U.S. PATENT DOCUMENTS

| 4,319,243 A * | 3/1982 | Vachenauer | G01S 13/48 342/37 |
|---|---|---|---|
| 8,487,810 B2 * | 7/2013 | Grau Besoli | H01Q 1/525 342/134 |
| 9,772,422 B2 * | 9/2017 | Hull | G01R 33/028 |
| 2009/0073023 A1 * | 3/2009 | Ammar | G01S 17/89 342/22 |
| 2011/0181300 A1 * | 7/2011 | Bowring | G01S 13/08 324/637 |
| 2011/0298652 A1 * | 12/2011 | Yanagihara | G01S 13/003 342/146 |
| 2012/0206302 A1 * | 8/2012 | Ramachandran | H01Q 1/22 343/702 |
| 2013/0113647 A1 * | 5/2013 | Sentelle | G01S 13/887 342/22 |
| 2016/0363652 A1 * | 12/2016 | Hammings | G01S 13/872 |
| 2017/0285158 A1 * | 10/2017 | Halbert | G01S 13/726 |
| 2018/0074173 A1 * | 3/2018 | Trotta | G01S 13/584 |

(Continued)

OTHER PUBLICATIONS

Fonseca, M. A., et al., "Flexible wireless passive pressure sensors for biomedical applications," Hilton Head 2006, Jun. 2006.

(Continued)

*Primary Examiner* — Tan H Trinh
(74) *Attorney, Agent, or Firm* — The Small Patent Law Group LLC; Joseph M. Butscher (57) ABSTRACT

A transceiver assembly is configured to detect an object. The transceiver assembly includes a first transmit antenna array configured to transmit a first signal at a first frequency, a second transmit antenna array configured to transmit a second signal at a second frequency that differs from the first frequency, and a receive antenna array configured to receive a third signal at a third frequency that is a difference between the first frequency and the second frequency. The transceiver assembly detects the object in response to reception of the third signal by the receive antenna array.

20 Claims, 7 Drawing Sheets

(56) References Cited

U.S. PATENT DOCUMENTS

| | | | | |
|---|---|---|---|---|
| 2018/0231651 | A1* | 8/2018 | Charvat | G01S 7/282 |
| 2018/0246200 | A1* | 8/2018 | Goossen | G01S 13/781 |
| 2018/0348339 | A1* | 12/2018 | Lien | G01S 7/006 |
| 2019/0167500 | A1* | 6/2019 | Baker | G01S 7/414 |
| 2019/0302252 | A1* | 10/2019 | Santra | G01S 7/415 |
| 2019/0391531 | A1* | 12/2019 | Qi | G01S 13/9011 |
| 2020/0033445 | A1* | 1/2020 | Raphaeli | H01Q 21/00 |
| 2020/0158859 | A1* | 5/2020 | Morton | G01S 13/887 |
| 2020/0158860 | A1* | 5/2020 | Morton | G01S 13/887 |
| 2020/0210002 | A1* | 7/2020 | Kim | G06F 3/046 |
| 2020/0319294 | A1* | 10/2020 | Va | H01Q 1/525 |
| 2020/0395685 | A1* | 12/2020 | Rogers | G01H 3/00 |
| 2021/0033729 | A1* | 2/2021 | Alalusi | G01S 13/32 |

OTHER PUBLICATIONS

Abad, E., et al., "Flexible tag microlab development: gas sensors integration in RFID flexible tags for food logistics," Sensors and Actuators B, Jul. 2007.

Rida, A., et al., "Conductive inkjet-printed antennas on flexible low-cost paper-based substrates for RFID and WSN applications," IEEE Antennas and Propagation Magazine, Jun. 2009.

Schwerdt, H. N., et al., "A fully passive wireless microsystem for recording of neuropotentials using RF backscattering methods," Journal of Microelectromechanical Systems, Aug. 2011.

Rose, D. P., et al., "Adhesive RFID sensor patch for monitoring of sweat electrolytes," IEEE Transactions on Biomedical Engineering, Jun. 2015.

Bito, J., et al., "Ambient RF energy harvesting from a two-way talk radio for flexible wearable wireless sensor devices utilizing inkjet printing technologies," IEEE Transactions on Microwave Theory and Techniques, Dec. 2015.

Escobedo, P., et al., "Flexible passive near field communication tag for multigas sensing," Analytical Chemistry, Dec. 2016.

Xu, G., et al., "Passive and wireless near field communication tag sensors for biochemical sensing with smartphone," Sensors and Actuators B, Feb. 2017.

Pozar, D.M., "Microstrip antenna aperture-coupled to a microstrip line," Electronics Letters, Jan. 1985.

Pozar, D.M., Kaufman, B., "Increasing the bandwidth of a microstrip antenna by proximity coupling," Electronics Letters, Apr. 1987.

Hallil, H., et al., "Feasibility of wireless gas detection with an FMCW RADAR interrogation of passive RF gas sensor," IEEE Sensors, Nov. 2010.

Iwasaki, H., "A circularly polarized small-size microstrip antenna with a cross slot," IEEE Transactions an Antennas and Propagation, Oct. 1996.

Papapolymerou, I., et al., "Micromachined patch antennas," IEEE Transactions on Antennas and Propagation, Feb. 1998.

Gauthier, G.P., et al., "A 94 GHz aperture-coupled micromachined microstrip antenna," IEEE Transactions on Antennas and Propagation, Dec. 1999.

Cook, B.S., et al., "Multilayer inkjet printing of millimeter-wave proximity-fed patch arrays on flexible substrates," IEEE Antennas and Wireless Propagation Letters, Oct. 2013.

Sorkherizi, M.S., et al., "Planar high-efficiency antenna array using new printed ridge gap waveguide technology," IEEE Transactions on Antennas and Propagation, Jul. 2017.

Yi, X., et al., "Passive wireless smart-skin sensor using RFID-based folded patch antennas," International Journal of Smart and Nano Materials, Mar. 2011.

Zhang, N., et al., "Temperature sensor based on 4H-silicon carbide pn diode operational from 20C to 600C," Applied Physics Letters, Feb. 2014.

Rogers, J.E., et al., "A passive wireless microelectromechanical pressure sensor for harsh environments," Journal of Microelectromechanical Systems, Feb. 2018.

* cited by examiner

TRANSCEIVER ASSEMBLY FOR DETECTING OBJECTS

FIELD OF EMBODIMENTS OF THE DISCLOSURE

Embodiments of the present disclosure generally relate to systems and methods for detecting objects, and, more particularly, to a transceiver assembly that is configured to detect foreign objects within a structure, such as during the manufacture of a vehicle.

BACKGROUND OF THE DISCLOSURE

As a vehicle is being manufactured, foreign objects (that is, objects that are not to be part of the vehicle) may be present in an environment, and may infiltrate or otherwise settle on (or in) various components of the vehicle. As an example, one or more tools that are used to manufacture an aircraft may be inadvertently left on or in portions of the aircraft. Known systems and methods for searching for foreign objects left on airplanes are typically time and labor intensive, prone to human error, and costly.

As an example, a common method of preventing foreign objects within structures includes reporting of lost tools. A technician, for example, may perform a procedure to account for all of the tools used during a work period. If any tools are missing, the technician performs a visual search for the missing tool(s). While such a method initiates a search for a foreign object (such as a missing tool), it does not provide an efficient way of finding the foreign object, nor does it guarantee the tool(s) will be found.

SUMMARY OF THE DISCLOSURE

A need exists for an efficient system and method for detecting objects, such as foreign object debris within a structure. Further, a need exists for a portable and light weight system that may be carried and used by an individual, such as a technician, to detect objects.

With those needs in mind, certain embodiments of the present disclosure provide a transceiver assembly for detecting an object (such as a foreign object). The transceiver assembly includes a first transmit antenna array configured to transmit a first signal at a first frequency, a second transmit antenna array configured to transmit a second signal at a second frequency that differs from the first frequency, and a receive antenna array configured to receive a third signal at a third frequency that is a difference between the first frequency and the second frequency. The transceiver assembly is configured to detect the object in response to reception of the third signal by the receive antenna array.

In at least one embodiment, a housing retains the first transmit antenna array, the second transmit antenna array, and the receive antenna array. A handle may be connected to the housing, such as by being attached to or part of the housing. The housing may include a base panel, an electronics panel attached to the base panel, a spacer panel attached to the electronics panel (such that the electronics panel is sandwiched between the base panel and the spacer panel), and an antenna panel attached to the spacer panel (such that the spacer panel is sandwiched between the electronics panel and the antenna panel). The first transmit antenna array, the second transmit antenna array, and the receive antenna array are secured to the antenna panel.

In at least one embodiment, at least one transmitter is coupled to the first transmit antenna array and the second transmit antenna array. For example, a single transmitter is coupled to both the first transmit antenna array and the second transmit antenna array. As another example, a first transmitter is coupled to the first transmit antenna array, and a second transmitter is coupled to the second transmit antenna array.

In at least one embodiment, a receiver is coupled to the receive antenna array. A display may be coupled to the receiver.

The first signal and the second signal may be within a common frequency band. For example, the first signal and the second signal may be within a W-band, and the third signal may be within an X-band.

Certain embodiments of the present disclosure provide a method of detecting an object by a transceiver assembly. The method includes transmitting, by a first transmit antenna array, a first signal at a first frequency; transmitting, by a second transmit antenna array, a second signal at a second frequency that differs from the first frequency; receiving, by a receive antenna array, a third signal at a third frequency that is a difference between the first frequency and the second frequency; and detecting the object via the receiving.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a transceiver assembly that is configured to detect an object, such as foreign object debris within a structure (for example, a vehicle). The transceiver assembly includes a first transmit antenna array that transmits a first signal (such as a first time-varying power signal) at a first frequency and a second transmit antenna array that transmits a second signal (such as a second time-varying power signal) at a second frequency that differs from the first frequency. The transceiver assembly also includes a receive antenna array that receives a third signal (such as a third time-varying power signal) that is reflected from the object, such as from a radio frequency identification (RFID) tag coupled to (for example, attached to or mounted on) the object. The third signal is at a third frequency that is a difference between the first frequency and the second frequency. As such, the third frequency is a difference frequency between the first frequency and the second frequency. Reception of the third frequency by the transceiver assembly allows for detection of the object.

Figure 1:
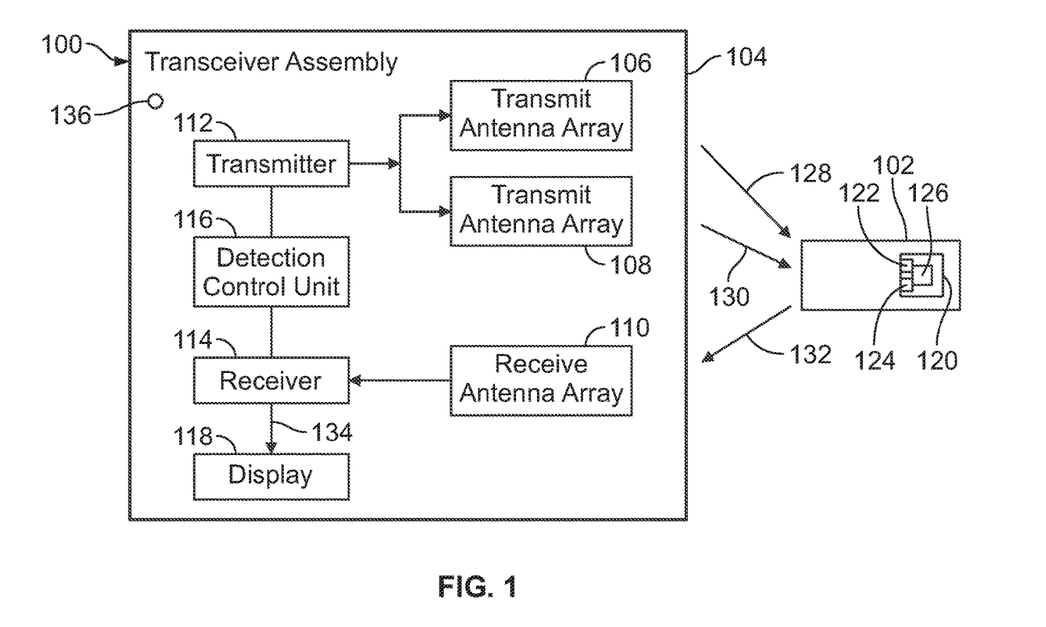
FIG. 1 illustrates a schematic box diagram of a transceiver assembly that is configured to detect an object, according to an embodiment of the present disclosure.

FIG. 1 illustrates a schematic box diagram of a transceiver assembly 100 that is configured to detect an object 102, according to an embodiment of the present disclosure. The transceiver assembly 100 includes a housing 104 that retains a first transmit antenna array 106, a second transmit antenna array 108, and a receive antenna array 110. The first transmit antenna array 106 and the second transmit antenna array 108 are coupled to (for example, electrically connected to) a transmitter 112, such as through one or more wired or wireless connections. The receive antenna array 110 is coupled to (for example, electrically connected to) a receiver 114, such as through one or more wired or wireless connections. The receiver 114 includes or is otherwise in communication with a detection control unit 116, reference clock, and/or the like. That is, the detection control unit 116 may be an integral part of the receiver 114, or may be separate and distinct from the receiver 114 and coupled to (for example, electrically connected to) the receiver 114 through one or more wired or wireless connections. The receiver 114 (and/or the detection control unit 116) is also in communication with a display 118, such as through one or more wired or wireless connections. The display 118 may be a monitor, screen (such as a digital, light emitting diode (LED), liquid crystal display (LCD) screen, or the like), a touchscreen interface, and/or the like.

In at least one embodiment, the detection control unit 116 is configured to control operation of the receiver 114. In at least one embodiment, the detection control unit 116 is also in communication with the transmitter 112 and is configured to control operation thereof. In at least one embodiment, the receiver 114 includes or is otherwise in communication with a first detection control unit and the transmitter 112 includes or is otherwise in communication with a second detection control unit. In at least one other embodiment, a single detection control unit 116 is in communication with (and configured to control) both the transmitter 112 and the receiver 114. In at least one other embodiment, the transceiver assembly 100 may not include a distinct detection control unit or reference clock.

The object 102 may be a tool, fastener, panel, beam, or any type of object that is to be detected, as desired. An identifying tag 120 is secured to the object 102, such as through a fastener, adhesives, and/or the like. In at least one embodiment, the identifying tag 120 is an RFID tag that is configured to receive and transmit radio frequency (RF) signals. In at least one embodiment, the identifying tag 120 includes one or more antennas, such as a receive antenna 122 and a transmit antenna 124 coupled to (for example, electrically connected to) a non-linear device, such as a frequency mixing diode 126.

In operation, the transmitter 112 provides a time-varying power signal to the first transmit antenna array 106, which in response, transmits a first signal 128 (such as a first time-varying power signal) at a first frequency. Similarly, the transmitter 112 provides a time-varying power signal to the second transmit antenna array 108, which in response, transmits a second signal 130 (such as a second time-varying power signal) at a second frequency that differs from the first frequency. In at least one embodiment, the first frequency and the second frequency are in a common frequency band. For example, the first frequency may be at 85 GHz, while the second frequency may be at 75 GHz. In at least one other embodiment, the first frequency may be within a first frequency band (such as the W-band), while the second frequency may be within a second frequency band that differs from the first frequency band (such as the K-band or V-b and).

The receive antenna 122 of the identifying tag 120 of the object 102 receives the first signal 128 and the second signal 130, which are then received by the frequency mixing diode 126. In response, the frequency mixing diode 126 then outputs a third signal 132 at a third frequency that is the difference between the first frequency of the first signal 128 and the second frequency of the second signal 130. As such, the third signal 132 is a difference signal. As an example, if the first signal 128 is at 85 GHz, and the second signal 130 is at 75 GHz, the identifying tag 120 reflects or otherwise outputs (such as via the frequency mixing diode 126) the third signal 132 at 10 GHz.

The receive antenna array 110 of the transceiver assembly 100 receives the third signal 132. As the third signal 132 is received by the receive antenna array 110, current is generated at terminals thereof, which in turn is detected by the receiver 114. By receiving the third signal 132 at the third frequency, which is the difference between the first frequency of the first signal 128 and the second frequency of the second signal 130, the receiver 114 detects the presence of the identifying tag 120 and therefore the object 102, due to the frequency difference between the known first signal 128 and the second signal 130, which are transmitted by the first transmit antenna array 106 and the second transmit antenna array 108, respectively. The detection control unit 116, which may be part of the receiver 114 or in communication with the receiver 114, recognizes the third signal 132 as presence of the object 102, and outputs a detection signal 134 to the display 118, which, in turn, shows an indication of the presence of the object 102. Optionally, the receiver 114 and/or the detection control unit 116 may be coupled to an audio device, such as a speaker, which emits an audio signal in response to reception of the detection signal 134 to indicate the presence of the object 102.

As noted, the identifying tag 120 may be an RFID tag. The size of the identifying tag 120 may generally decrease as frequency increases due to antenna size being proportional to wavelength (or inversely proportional to frequency). By transmitting at a higher frequency (such as within the W-band), and receiving at a lower difference frequency (such as within the X-band), the transceiver assembly 100 is able to operate at a larger distance from the identifying tag 120.

In at least one embodiment, an activation member 136, such as a button, switch, trigger, or the like is in communication with the transmitter 112 and/or the detection control unit 116, such as through one or more wired or wireless connections. As an individual engages the activation member 136, the first transmit antenna array 106 and the second transmit antenna array 108 output the first signal 128 and the second signal 130, respectively, as described herein. Optionally, the transceiver assembly 100 may not include the activation member 136.

As used herein, the term "control unit," "unit," "central processing unit," "CPU," "computer," or the like may include any processor-based or microprocessor-based system including systems using microcontrollers, reduced instruction set computers (RISC), application-specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the detection control unit 116 may be or include one or more processors that are configured to control operation of the receiver 114 (and optionally the transmitter 112).

The detection control unit 116 is configured to execute a set of instructions that are stored in one or more storage elements (such as one or more memories), in order to process data. For example, the detection control unit 116 may include or be coupled to one or more memories. The storage elements may also store data or other information as desired or needed. The storage elements may be in the form of an information source or a physical memory element within a processing machine.

The set of instructions may include various commands that instruct the detection control unit 116 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, in response to results of previous processing, or in response to a request made by another processing machine.

The diagrams of embodiments herein may illustrate one or more control or processing units, such as the detection control unit 116. It is to be understood that the processing or control units may represent electronic circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the detection control unit 116 may represent processing circuitry such as one or more of a field-programmable gate array (FPGA), ASIC, microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
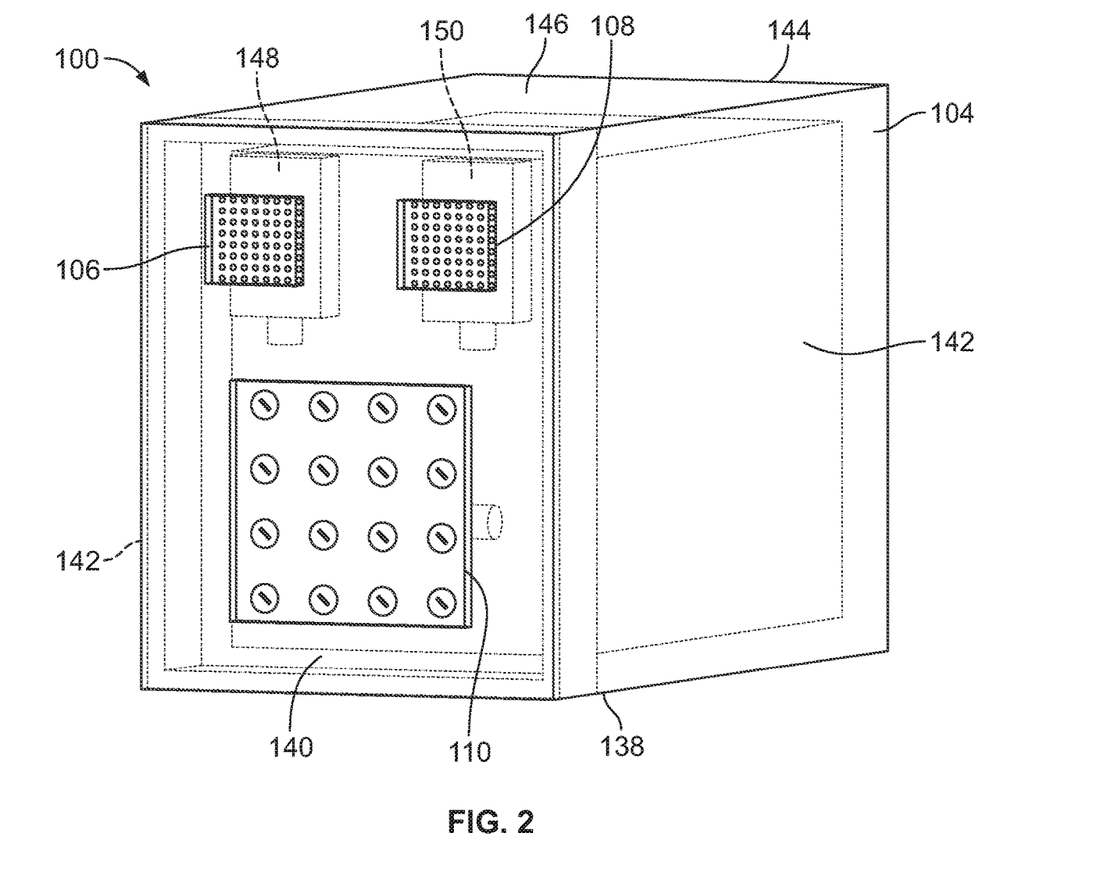
FIG. 2 illustrates a perspective front view of the transceiver assembly.
Figure 3:
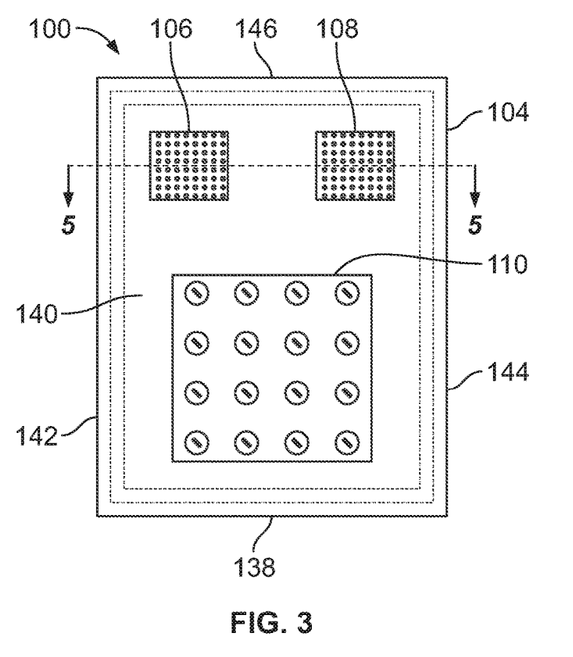
FIG. 3 illustrates a front view of the transceiver assembly.

FIG. 2 illustrates a perspective front view of the transceiver assembly 100. FIG. 3 illustrates a front view of the transceiver assembly 100. Referring to FIGS. 2 and 3, the housing 104 of the transceiver assembly 100 includes a base 138 connected to a front wall 140, lateral walls, 142, a rear wall 144, and a top wall 146. In at least one embodiment, the first transmit antenna array 106, the second transmit antenna array 108, and the receive antenna array 110 may be disposed on the front wall 140. The first transmit antenna array 106 and the second transmit antenna array 108 may be coupled to (for example, electrically connected to) frequency multipliers 148 and 150, respectively.

The transmitter 112 and the receiver 114 (shown in FIG. 1) are contained within the housing 104. The detection control unit(s) 116 may also be contained within the housing 104. Optionally, the detection control unit(s) 116 may be remotely located from the housing 104. In at least one embodiment, as noted above, the transmitter 112 and the receiver 114 may each include a detection control unit. The display 118 (shown in FIG. 1) may be disposed on a portion of the housing 104 (such as the top wall 146 or the rear wall 144, and/or on a handle coupled to the housing 104. Optionally, the display 118 may be remotely located from the housing 104.

Figure 4:
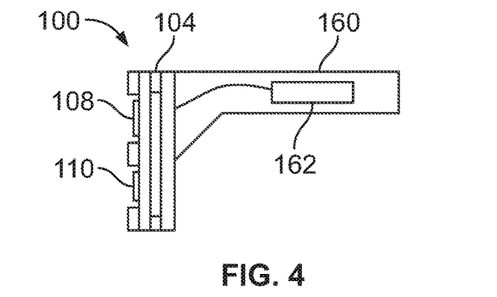
FIG. 4 illustrates a simplified lateral view of the transceiver assembly.

FIG. 4 illustrates a simplified lateral view of the transceiver assembly 100. In at least one embodiment, the transceiver assembly 100 includes a handle 160 connected to the housing 104. A power source 162, such as a battery, is mounted in the handle 160, or optionally the housing 104, and is configured to provide operative power to the transceiver assembly 100. The handle 160 allows an individual to easily grasp and manipulate the transceiver assembly 100. Alternatively, the transceiver assembly 100 may not include the handle 160.

Figure 5:
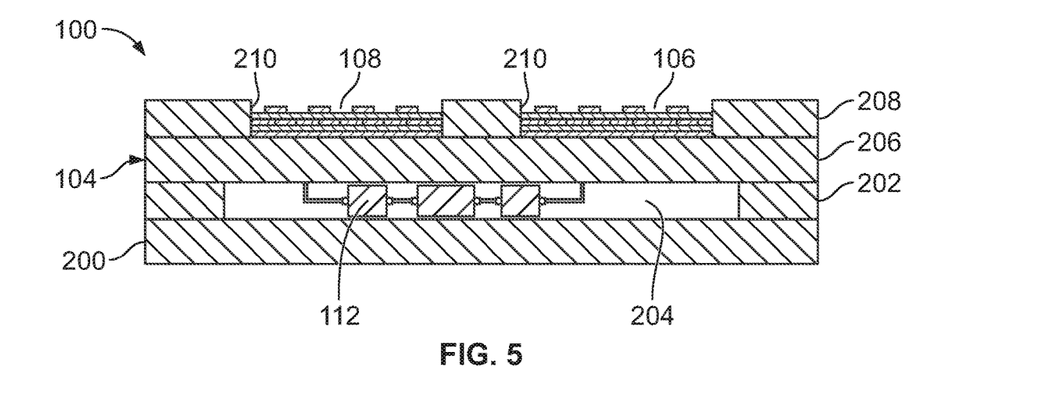
FIG. 5 illustrates a cross-sectional view of the transceiver assembly through line 5-5 of FIG. 3.

FIG. 5 illustrates a cross-sectional view of the transceiver assembly 100 through line 5-5 of FIG. 3. In at least one embodiment, the transceiver assembly 100 includes a plurality of panels, which may be additively printed panels. The panels may be formed of a conducting material (for example, aluminum), or a non-conducting material (for example, plastic or composite material).

In at least one embodiment, a base panel 200 is coupled to (for example, attached to) an electronics panel 202. The transmitter 112 is retained within a cavity 204 of the electronics panel 202. Similarly, the receiver 114 (shown in FIG. 1) may also be retained within a cavity 204 of the electronics panel 202. A spacer panel 206 is attached to the electronics panel 202, such that the electronics panel 202 is sandwiched between the base panel 200 and the spacer panel 206. An antenna panel 208 is connected to the spacer panel 206, such that the spacer panel 206 is sandwiched between the electronics panel 202 and the antenna panel 208. The antenna panel 208 includes pockets 210 into which the first transmit antenna array 106, the second transmit antenna array 108, and the receive antenna array 110 (shown in FIG. 1) are secured and retained. The transmitter 112 may be coupled to (for example, electrically connected to) the first transmit antenna array 106 and the second transmit antenna array 108 through radio frequency (RF) cables that extend through channels formed in the spacer panel 206. Similarly, the receiver 114 may be coupled to (for example, electrically connected to) the receive antenna array 110 through RF cables that extend through a channel formed in the spacer panel 206. Optionally, the transceiver assembly 100 may not include the spacer panel 206.

Referring to FIGS. 1 and 5, in at least one embodiment, in order to form the transceiver assembly 100, the first transmit antenna array 106, the second transmit antenna array 108, and the receive antenna array 110 are fabricated, formed, or otherwise provided. Next, the panels (for example, the base panel 200, the electronics panel 202, the spacer panel 206, and the antenna panel 208) of the housing 104 are formed. Next, the first transmit antenna array 106, the second transmit antenna array 108, and the receive antenna array 110 are attached to one or more of the panels, such as the antenna panel 208. The transmitter 112 and the receiver 114 are then disposed between one or more panels, such as the electronics panel 202. The panels are then assembled together. The assembling of the panels may include electrically connected the first transmit antenna array 106 and the second transmit antenna array to the transmitter 112 and electrically connected the receive antenna array 110 to the receiver 114

The configuration of the transceiver assembly 100 shown in FIG. 5 is merely for exemplary purposes. The housing 104 may be formed and constructed in various different ways with various different components. For example, the housing 104 may be formed from more or less panels than shown. As another example, the housing 104 may be formed via an injection molding process.

Referring to FIGS. 1-5, the transceiver assembly 100 includes the first transmit antenna array 106 that transmits the first signal 128 at the first frequency, and the second transmit antenna array 108 that transmit the second signal 130 at the second frequency, which differs from the first frequency. Accordingly, the transceiver assembly 100 is configured to transmit signals at two different frequencies. The receive antenna array 110 receives the third signal 132, which is reflected from the object 102 at a frequency difference between the first frequency of the first signal 128 and the second frequency of the second signal 130. As such, the third signal is a difference signal in that the third frequency of the third signal 132 is a difference between the first frequency of the first signal 128 and the second frequency of the second signal 130. The receiver 114 may be integrated with the receive antenna array 110. The transmitter 112 may be located behind the first transmit antenna array 106, the second transmit antenna array 108, and the receive antenna array 110. The transmitter 112 may be electrically connected to the first transmit antenna array 106 and the second transmit antenna array 108, such as through waveguides, coaxial cables, and/or the like. The transceiver assembly 100 may be adapted to linearly polarized and circularly polarized antenna types. Further, the transceiver assembly 100 may be adapted to rectangular and circular waveguide types for efficient signal propagation.

Figure 6:
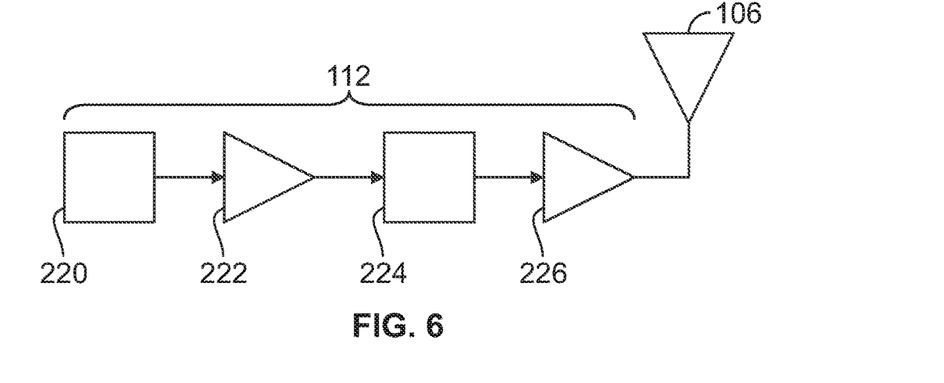
FIG. 6 illustrates a schematic diagram of a transmitter coupled to a first transmit antenna array, according to an embodiment of the present disclosure.

FIG. 6 illustrates a schematic diagram of a transmitter 112 coupled to the first transmit antenna array 106, according to an embodiment of the present disclosure. Each of the first transmit antenna array 106 and the second transmit antenna array 108 (shown in FIG. 1) may be coupled to a separate transmitter 112. As such, the transmitter 112 shown in FIG. 1 may represent two separate transmitters 112, each of which is coupled to a respective one of the first transmit antenna array 106 and the second transmit antenna array 108.

The transmitter 112 may include an intermediate frequency (IF) signal source 220, an IF amplifier 222, a frequency multiplier 224 for upconverting the IF signal into an RF signal, and an RF amplifier 226. The first transmit antenna array 106 radiates the RF signal into free space.

It is to be understood that the transmitter 112 shown in FIG. 6 is merely exemplary. Various other types of transmitters may be used with embodiments of the present disclosure.

Figure 7:
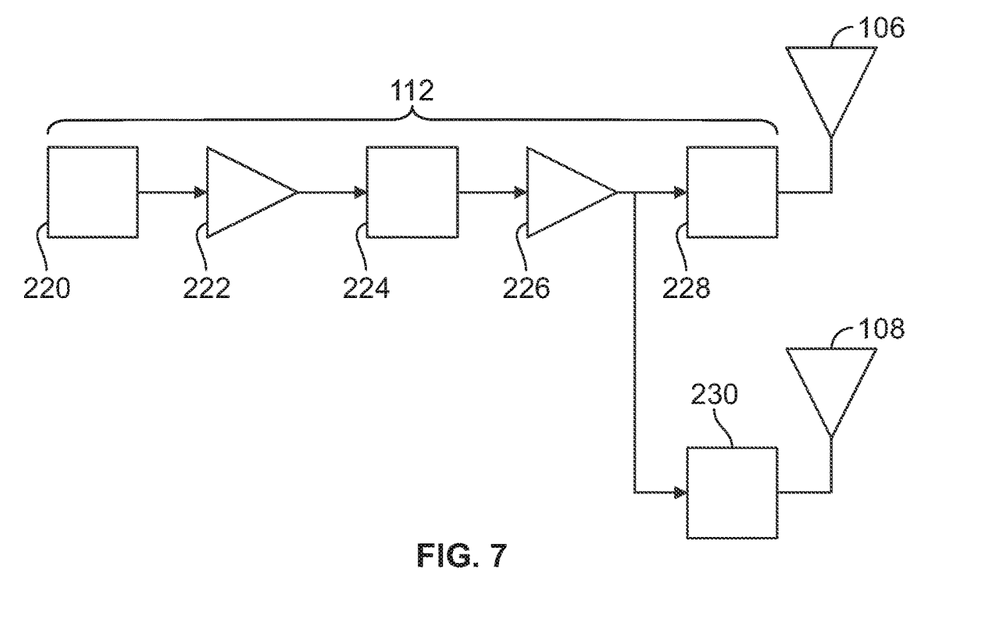
FIG. 7 illustrates a schematic diagram of a transmitter coupled to a first transmit antenna array and a second transmit antenna array, according to an embodiment of the present disclosure.

FIG. 7 illustrates a schematic diagram of the transmitter 112 coupled to the first transmit antenna array 106 and the second transmit antenna array 108, according to an embodiment of the present disclosure. In this embodiment, the single transmitter 112 is coupled to both the first transmit antenna array 106 and the second transmit antenna array 108. The IF signal source 220 generates two signals, which are amplified by the IF amplifier 222. The frequency multiplier 224 upconverts the two IF signals into two RF signals, which are amplified by the RF amplifier 226. A first bandpass filter 228 is coupled to the first transmit antenna array 106, and a second bandpass filter 230 is coupled to the second transmit antenna array 108. The first bandpass filter 228 and the second bandpass filter 230 separate the two RF signals, which are then respectively radiated into free space by the first transmit antenna array 106 and the second transmit antenna array 108.

It is to be understood that the transmitter 112 shown in FIG. 7 is merely exemplary. Various other types of transmitters may be used with embodiments of the present disclosure.

Figure 8:
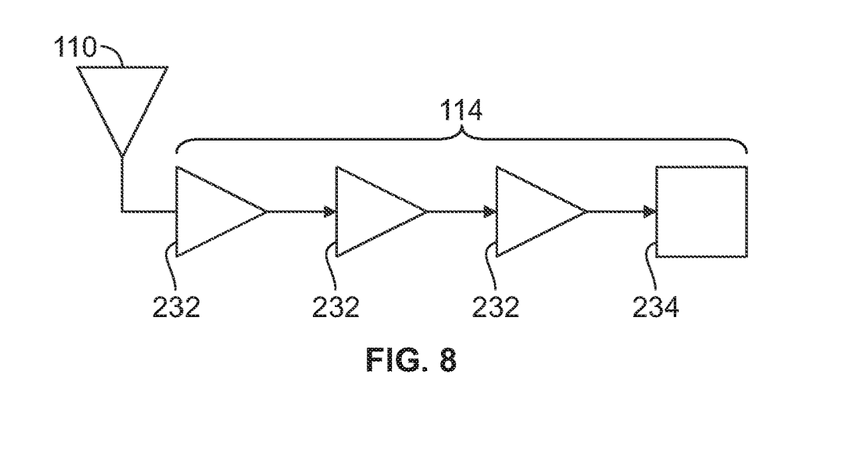
FIG. 8 illustrates a schematic diagram of a receiver coupled to a receive antenna array, according to an embodiment of the present disclosure.

FIG. 8 illustrates a schematic diagram of the receiver 114 coupled to the receive antenna array 110, according to an embodiment of the present disclosure. The receiver 114 may include one or more RF amplifiers 232 coupled to a power detector 234. An RF signal (such as the third signal 132, shown in FIG. 1) received by the receive antenna array 110 is amplified by the RF amplifiers 232, and fed into the power detector 234, which provides an output time-invariant direct current (DC) voltage signal that is linearly proportional to the input RF power. The output DC voltage may then be sent to the display 118 (shown in FIG. 1).

It is to be understood that the receiver 114 shown in FIG. 8 is merely exemplary. Various other types of receivers may be used with embodiments of the present disclosure.

Figure 9:
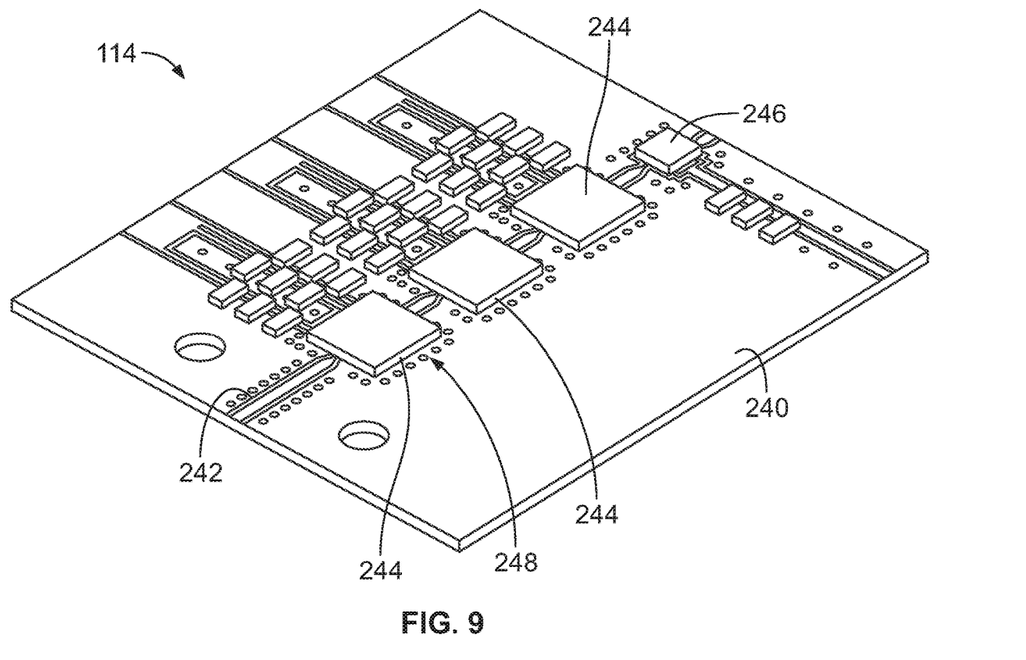
FIG. 9 illustrates a perspective top view of the receiver, according to an embodiment of the present disclosure.

FIG. 9 illustrates a perspective top view of the receiver 114, according to an embodiment of the present disclosure. The receiver 114 may be disposed on a circuit board 240 and coupled to the receive antenna array 110 (shown in FIG. 1). The receiver 114 may include grounded coplanar waveguide (GCPW) transmission lines 242 electrically connecting the electronic components, such as low noise amplifiers (LNAs) 244, and a power detector 246. Electrical vias 248 are proximate to the grounded coplanar waveguide transmission lines 242 in order to maintain a low impedance between opposed ground planes. Power planes may also be provided for supplying power to the various electronic components.

It is to be understood that the receiver 114 shown in FIG. 9 is merely exemplary. Various other types of receivers may be used with embodiments of the present disclosure.

Figure 10:
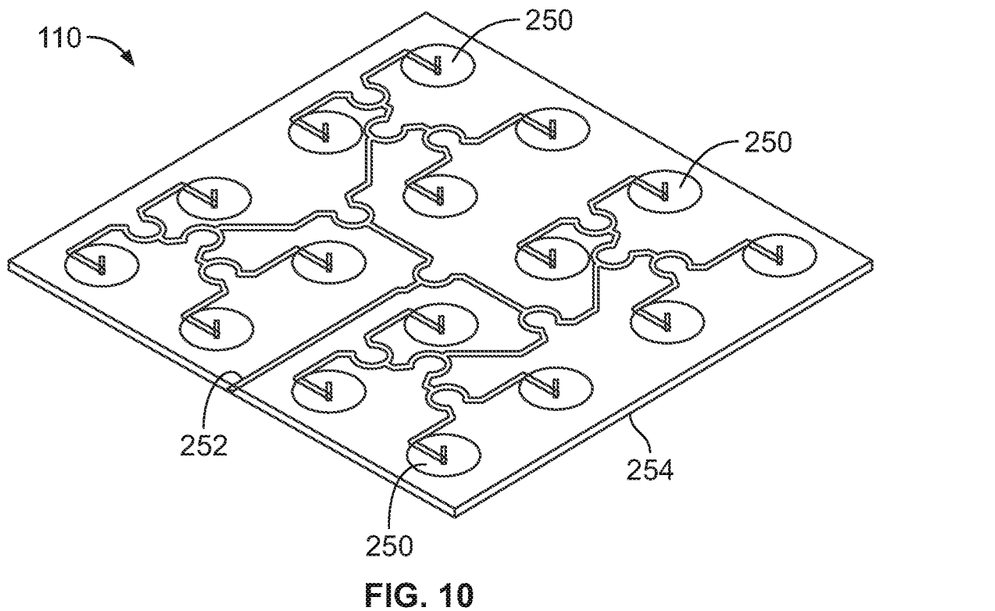
FIG. 10 illustrates a perspective top view of a receive antenna array, according to an embodiment of the present disclosure.

FIG. 10 illustrates a perspective top view of the receive antenna array 110, according to an embodiment of the present disclosure. The receive antenna array 110 may be an X-band antenna array. The receive antenna array 110 includes a plurality of antenna elements 250 (such as in a 4×4 array) proximity coupled to an embedded microstrip feed network 252 with a backside ground plane 254.

It is to be understood that the receive antenna array 110 shown in FIG. 10 is merely exemplary. Various other types of receive antenna arrays may be used with embodiments of the present disclosure.

Figure 11:
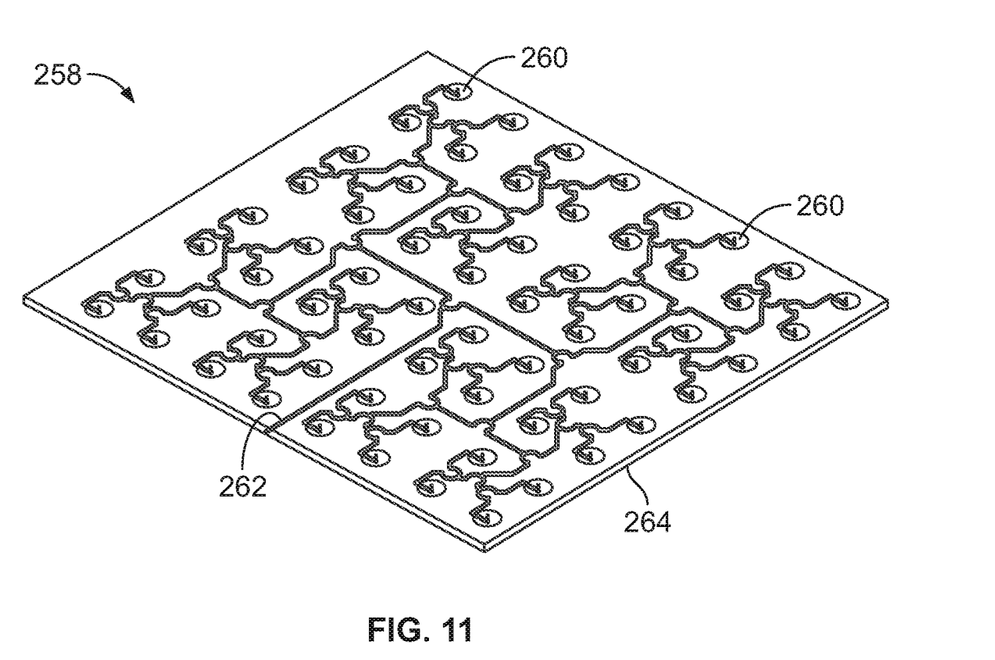
FIG. 11 illustrate a perspective top view of a transmit antenna array, according to an embodiment of the present disclosure.

FIG. 11 illustrate a perspective top view of a transmit antenna array 258, according to an embodiment of the present disclosure. One or both of the first transmit antenna array 106 and/or the second transmit antenna array 110 shown in FIG. 1 may be configured as the transmit antenna array 258. The transmit antenna array 258 may be a W-band antenna array. The transmit antenna array 258 includes a plurality of antenna elements 260 (such as in an 8×8 array) proximity coupled to an embedded microstrip feed network 262 with a backside ground plane 264.

It is to be understood that the transmit antenna array 258 shown in FIG. 11 is merely exemplary. Various other types of receive antenna arrays may be used with embodiments of the present disclosure.

Figure 12:
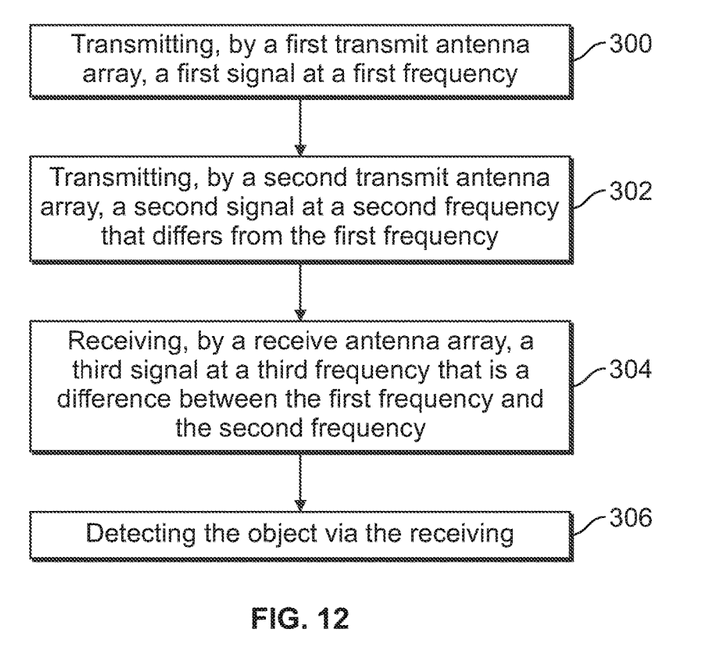
FIG. 12 illustrates a flow chart of a method of detecting an object with a transceiver assembly, according to an embodiment of the present disclosure.

FIG. 12 illustrates a flow chart of a method of detecting the object 102 (shown in FIG. 1) with the transceiver assembly 100 (shown in FIG. 1), according to an embodiment of the present disclosure. Referring to FIGS. 1 and 12, the method includes transmitting (300), by the first transmit antenna array 106, the first signal 128 at the first frequency; transmitting (302), by the second transmit antenna array 108, the second signal 130 at the second frequency (which differs from the first frequency); receiving (304), by the receive antenna array 110, the third signal 132 at the third frequency that is a difference between the first frequency and the second frequency; and detecting (306) the object 102 via said receiving (304).

Figure 13:
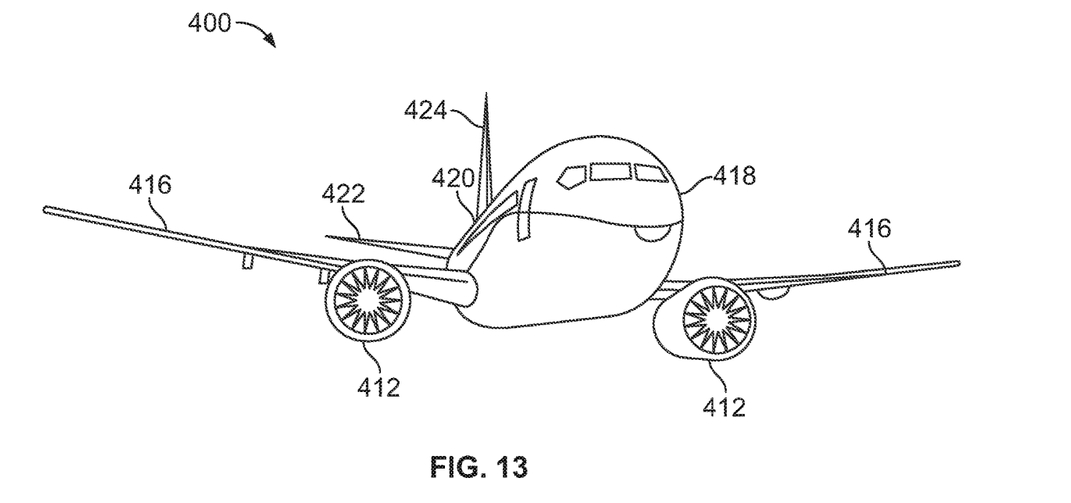
FIG. 13 illustrates a perspective front view of an aircraft.

FIG. 13 illustrates a perspective front view of an aircraft 400. Embodiments of the present disclosure may be used to detect foreign objects within the aircraft 400. For example, as the aircraft 400 is being assembled, the systems and methods described above may be used to detect various foreign objects (such as tools) left within portions of the aircraft 400.

The aircraft 400 may include a propulsion system that may include two engines 412, for example. Optionally, the propulsion system may include more engines 412 than shown. The engines 412 are carried by wings 416 of the aircraft 400. In other embodiments, the engines 412 may be carried by a fuselage 418 and/or an empennage 420. The empennage 420 may also support horizontal stabilizers 422 and a vertical stabilizer 424. The wings 416, the horizontal stabilizers 422, and the vertical stabilizer 424 may each include one or more control surfaces.

Optionally, embodiments of the present disclosure may be used to detect foreign objects within various other structures, such as other vehicles (including automobiles, watercraft, spacecraft, and the like), buildings, appliances, and the like.

As described herein, embodiments of the present disclosure provide a compact, light, and efficient transceiver assembly that is configured to detect objects, such as foreign object debris within a structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A transceiver assembly for detecting an object, the transceiver assembly comprising:
   a first transmit antenna array configured to transmit a first signal at a first frequency;
   a second transmit antenna array configured to transmit a second signal at a second frequency that differs from the first frequency;
   a receive antenna array configured to receive a third signal at a third frequency that is a difference between the first frequency and the second frequency, wherein the transceiver assembly is configured to detect the object in response to reception of the third signal by the receive antenna array; and a housing that retains the first transmit antenna array, the second transmit antenna array, and the receive antenna array, wherein the housing comprises:
a base panel;
an electronics panel attached to the base panel;
a spacer panel attached to the electronics panel, wherein the electronics panel is sandwiched between the base panel and the spacer panel; and
an antenna panel attached to the spacer panel, wherein the spacer panel is sandwiched between the electronics panel and the antenna panel, and wherein the first transmit antenna array, the second transmit antenna array, and the receive antenna array are secured to the antenna panel.

2. The transceiver assembly of claim 1, further comprising a handle attached to or part of the housing.

3. The transceiver assembly of claim 1, further comprising at least one transmitter coupled to the first transmit antenna array and the second transmit antenna array.

4. The transceiver assembly of claim 3, wherein the at least one transmitter comprises a single transmitter coupled to both the first transmit antenna array and the second transmit antenna array.

5. The transceiver assembly of claim 3, wherein the at least one transmitter comprises:
a first transmitter coupled to the first transmit antenna array; and
a second transmitter coupled to the second transmit antenna array.

6. The transceiver assembly of claim 1, further comprising a receiver coupled to the receive antenna array.

7. The transceiver assembly of claim 6, further comprising a display coupled to the receiver.

8. The transceiver assembly of claim 1, wherein the first signal and the second signal are within a common frequency band.

9. The transceiver assembly of claim 1, wherein the first signal and the second signal are within a W-band, and wherein the third signal is within an X-band.

10. A method of detecting an object by a transceiver assembly, the method comprising:
retaining a first transmit antenna array, a second transmit antenna array, and a receive antenna array within a housing that includes a base panel, an electronics panel attached to the base panel, a spacer panel attached to the electronics panel, wherein the electronics panel is sandwiched between the base panel and the spacer panel, and an antenna panel attached to the spacer panel, wherein the spacer panel is sandwiched between the electronics panel and the antenna panel, and wherein the first transmit antenna array, the second transmit antenna array, and the receive antenna array are secured to the antenna panel;
transmitting, by the first transmit antenna array, a first signal at a first frequency;
transmitting, by the second transmit antenna array, a second signal at a second frequency that differs from the first frequency;
receiving, by the receive antenna array, a third signal at a third frequency that is a difference between the first frequency and the second frequency; and
detecting the object via said receiving.

11. The method of claim 10, wherein at least one transmitter is coupled to the first transmit antenna array and the second transmit antenna array.

12. The method of claim 10, wherein a receiver is coupled to the receive antenna array.

13. The method of claim 12, wherein a display is coupled to the receiver.

14. The method of claim 10, wherein the first signal and the second signal are within a common frequency band.

15. The method of claim 10, wherein the first signal and the second signal are within a W-band, and wherein the third signal is within an X-band.

16. A transceiver assembly for detecting an object, the transceiver assembly comprising:
a housing including a base panel, an electronics panel attached to the base panel, a spacer panel attached to the electronics panel, wherein the electronics panel is sandwiched between the base panel and the spacer panel, and an antenna panel attached to the spacer panel, wherein the spacer panel is sandwiched between the electronics panel and the antenna panel;
a first transmit antenna array secured to the antenna panel, wherein the first transmit antenna array is configured to transmit a first signal at a first frequency;
a second transmit antenna array secured to the antenna panel, wherein the second transmit antenna array is configured to transmit a second signal at a second frequency that differs from the first frequency;
at least one transmitter retained by the housing, wherein the at least one transmitter is coupled to the first transmit antenna array and the second transmit antenna array;
a receive antenna array secured to the antenna panel, wherein the receive antenna array is configured to receive a third signal at a third frequency that is a difference between the first frequency and the second frequency, and wherein the transceiver assembly is configured to detect the object in response to reception of the third signal by the receive antenna array;
a receiver retained by the housing, wherein the receiver is coupled to the receive antenna array; and
a display coupled to the receiver.

17. The transceiver assembly of claim 16, further comprising a handle attached to or part of the housing, wherein the display is retained by one or both of the housing or the handle.

18. The transceiver assembly of claim 16, wherein the at least one transmitter comprises a single transmitter coupled to both the first transmit antenna array and the second transmit antenna array.

19. The transceiver assembly of claim 16, wherein the at least one transmitter comprises:
a first transmitter coupled to the first transmit antenna array; and
a second transmitter coupled to the second transmit antenna array.

20. The transceiver assembly of claim 16, wherein the first signal and the second signal are within a common frequency band.

* * * * *